(12) United States Patent
Nishino et al.

(10) Patent No.: US 10,001,183 B2
(45) Date of Patent: Jun. 19, 2018

(54) BRAKE APPARATUS

(71) Applicant: HITACHI AUTOMOTIVE SYSTEMS, LTD., Ibaraki (JP)

(72) Inventors: Kimio Nishino, Atsugi (JP); Kenichiro Matsubara, Kasumigaura (JP); Wataru Yokoyama, Yokohama (JP); Tatsuro Kobune, Atsugi (JP); Hirotaka Oikawa, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 109 days.

(21) Appl. No.: 14/813,593

(22) Filed: Jul. 30, 2015

(65) Prior Publication Data
US 2016/0032995 A1    Feb. 4, 2016

(30) Foreign Application Priority Data

Jul. 31, 2014  (JP) ................................ 2014/156969

(51) Int. Cl.
*F16D 65/18* (2006.01)
*F16D 55/225* (2006.01)
(Continued)

(52) U.S. Cl.
CPC ........... *F16D 65/18* (2013.01); *F16D 55/225* (2013.01); *F16D 55/226* (2013.01);
(Continued)

(58) Field of Classification Search
CPC ..... F16D 65/18; F16D 65/183; F16D 2121/24
See application file for complete search history.

(56) References Cited

U.S. PATENT DOCUMENTS 8,781,703 B2 * 7/2014 Owen ..................... B60T 8/32
701/70
2006/0170284 A1 * 8/2006 Alvarez ................ B60T 7/122
303/191
(Continued)

FOREIGN PATENT DOCUMENTS

| JP | 08-182366 | 7/1996 |
| JP | 2004-142515 | 5/2004 |
| JP | 2014-129003 | 7/2014 |

OTHER PUBLICATIONS

Office Action dated Jan. 30, 2018 in corresponding Japanese patent application No. 2014-156969, with partial English translation.
(Continued)

*Primary Examiner* — Anna M Momper
(74) *Attorney, Agent, or Firm* — Wenderoth, Lind & Ponack, L.L.P.

(57) ABSTRACT

A brake apparatus comprising: a caliper having a piston configured to move a brake pad to be pressed on a disc rotor rotating with a wheel; a thrust retaining mechanism located in the caliper to thrust the piston and maintain braking force exerted by the thrust piston; an electric motor mounted on the caliper to operate the thrust retaining mechanism; and a controller configured to apply electric current to the electric motor in response to an application command or a release command, thereby perform control according to the commands, wherein the controller, upon receiving a release command, configured to operate the electric motor to reduce braking force exerted by the piston by performing current maintenance control which continuously applies electric current to the electric motor and switching control which successively switches between a larger and a smaller amount of electric current applied to the electric motor.

14 Claims, 6 Drawing Sheets

(51) Int. Cl.
*F16D 55/226* (2006.01)
*F16D 55/00* (2006.01)
*F16D 121/04* (2012.01)
*F16D 121/26* (2012.01)
*F16D 121/24* (2012.01)
*F16D 125/40* (2012.01)

(52) U.S. Cl.
CPC .. *F16D 2055/0016* (2013.01); *F16D 2121/04* (2013.01); *F16D 2121/24* (2013.01); *F16D 2121/26* (2013.01); *F16D 2125/40* (2013.01)

(56) References Cited

U.S. PATENT DOCUMENTS

2014/0142828 A1* 5/2014 Harada ................. B60T 13/146
  701/70
2015/0360667 A1* 12/2015 Yasui ................... F16D 55/227
  188/72.1

OTHER PUBLICATIONS

Machine translation of JP 2004-142515 previously cited in IDS filed on Jul. 30, 2015.

* cited by examiner

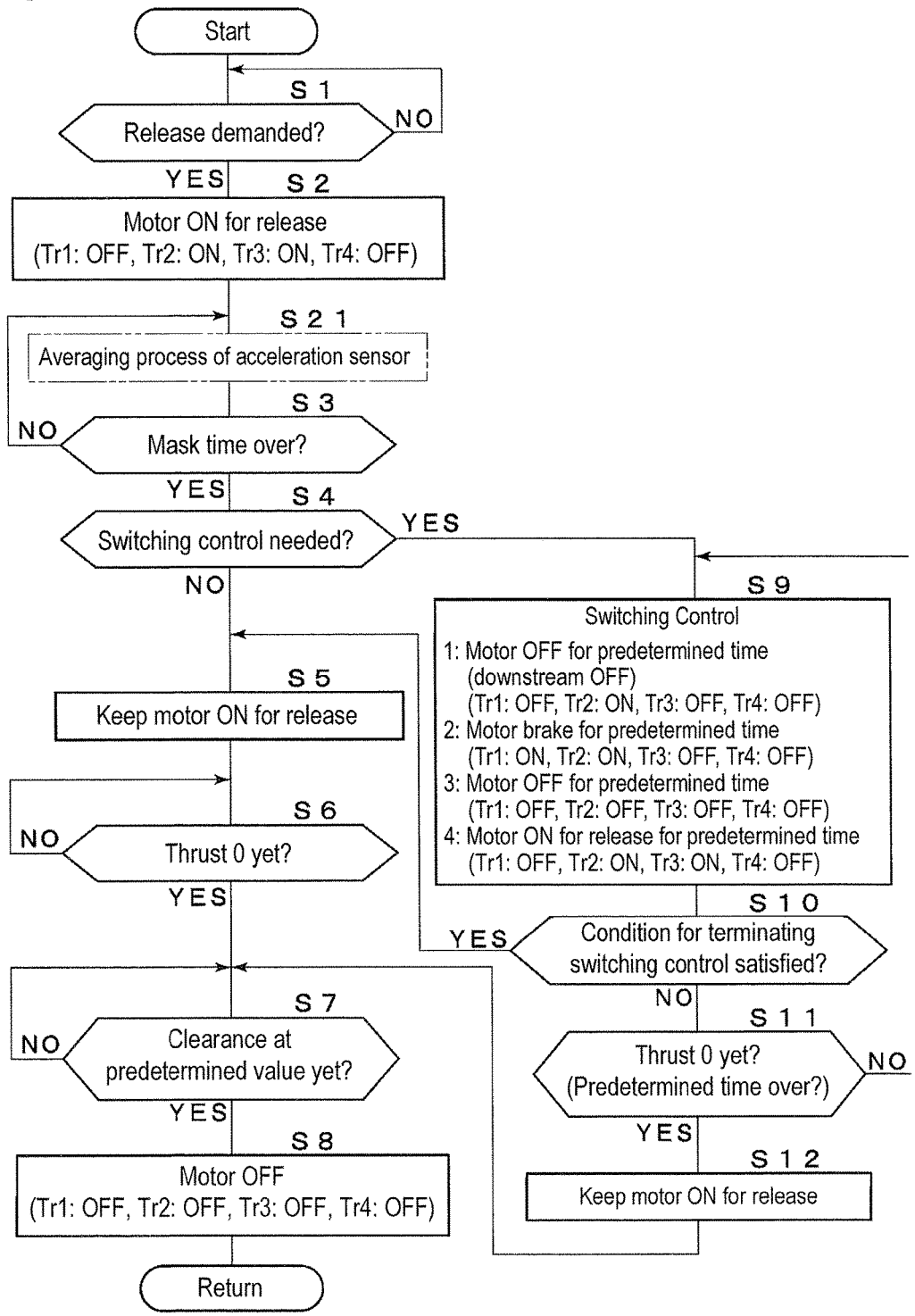

BRAKE APPARATUS

BACKGROUND ART

The present invention relates a brake apparatus for applying braking force to a vehicle.

Brake apparatuses having an electric parking brake function actuated by an electric motor are known for use in automobiles or other vehicles. To operate such a brake apparatus, the driver of a vehicle uses a parking brake switch to apply and release braking force with the aid of an electric motor of an electric parking brake. There is also a type of brake apparatus that automatically, without the driver's operation of the parking brake switch, applies braking force when a certain condition for brake application is met, for example, when the shift lever (or so-called select lever) is put into P (parking) or N (neutral), and releases it when a certain condition for release is met, for example, when the accelerator pedal is stepped on.

Patent Document 1, listed below, discloses an electric parking brake apparatus that uses an electric motor at a lower duty ratio, e.g., 50 percent, for release at a time of release when the vehicle is on a road inclined downward to a predetermined degree or greater in the direction of movement than that when the vehicle is on a level (i.e., horizontal) road.

Patent Document 1: Japanese Patent Public Disclosure No. 2004-142515

SUMMARY OF THE INVENTION

The brake apparatus of Patent Document 1 can (gradually) decrease the rate of reduction in piston thrust when the slope of a road in a given direction is greater than or equal to a certain degree at a time of brake release than the rate when the road is level; however, the release operation may not be smooth.

The object of the present invention is to provide a brake apparatus that reduces discomfort felt at a time of brake release and achieves smooth brake release operation.

One aspect of the present invention is to provide a brake apparatus comprising: a piston configured to move a friction member to be pressed on a rotating member rotating with a wheel to apply braking force to a vehicle; an electric motor configured to operate a thrust retaining mechanism to thrust the piston and maintain braking force exerted by the thrust piston, in response to electric current applied to the electric motor; a command generator configured to generate an application command for applying braking force to the vehicle and a release command for releasing braking force from the vehicle; and a controller configured to operate the electric motor upon receiving the release command generated by the command generator, by performing current maintenance control which continuously applies electric current to the electric motor, and switching control which successively switches between a larger and a smaller amount of electric current applied to the electric motor, so as to reduce braking force exerted by the piston.

Another aspect of the present invention is to provide a brake apparatus comprising: a caliper having a piston configured to move a brake pad to be pressed on a disc rotor rotating with a wheel; a thrust retaining mechanism located in the caliper to thrust the piston and maintain braking force exerted by the thrust piston; an electric motor mounted on the caliper to operate the thrust retaining mechanism; and a controller configured to apply electric current to the electric motor in response to an application command for applying braking force to the vehicle or a release command for releasing braking force from the vehicle, thereby perform control according to the commands, wherein the controller configured to, upon receiving a release command, operate the electric motor to reduce braking force exerted by the piston by performing current maintenance control which continuously applies electric current to the electric motor and switching control which successively switches between a larger and a smaller amount of electric current applied to the electric motor.

Still another aspect of the present invention is to provide a brake apparatus comprising: a piston configured to move a friction member to be pressed on a rotating member rotating with a wheel to apply braking force to a vehicle; an electric motor configured to operate a thrust retaining mechanism in response to electric current applied to the electric motor, so as to thrust the piston and maintain braking force exerted by the thrust piston; and a controller configured to apply electric current to the electric motor in response to an application command for applying braking force to the vehicle or a release command for releasing braking force from the vehicle, thereby perform control according to the commands, wherein the controller configured to, upon receiving a release command, operate the electric motor to reduce braking force exerted by the piston by performing current maintenance control which continuously applies electric current to the electric motor until the end of a predetermined time and subsequent switching control which successively switches between a larger and a smaller amount of electric current applied to the electric motor.

BRIEF DESCRIPTION OF THE DRAWINGS

FIG. 6 is a flowchart of a release control process performed by a parking brake control apparatus.

DETAILED DESCRIPTION OF THE PREFERRED EMBODIMENTS

Below, embodiments of brake apparatuses are described with reference to the accompanying drawings, illustrating a brake apparatus mounted in a four-wheel vehicle as an example. In the flowchart of FIG. 6, "S" denotes a step (e.g., S1 for step 1).

Figure 1:
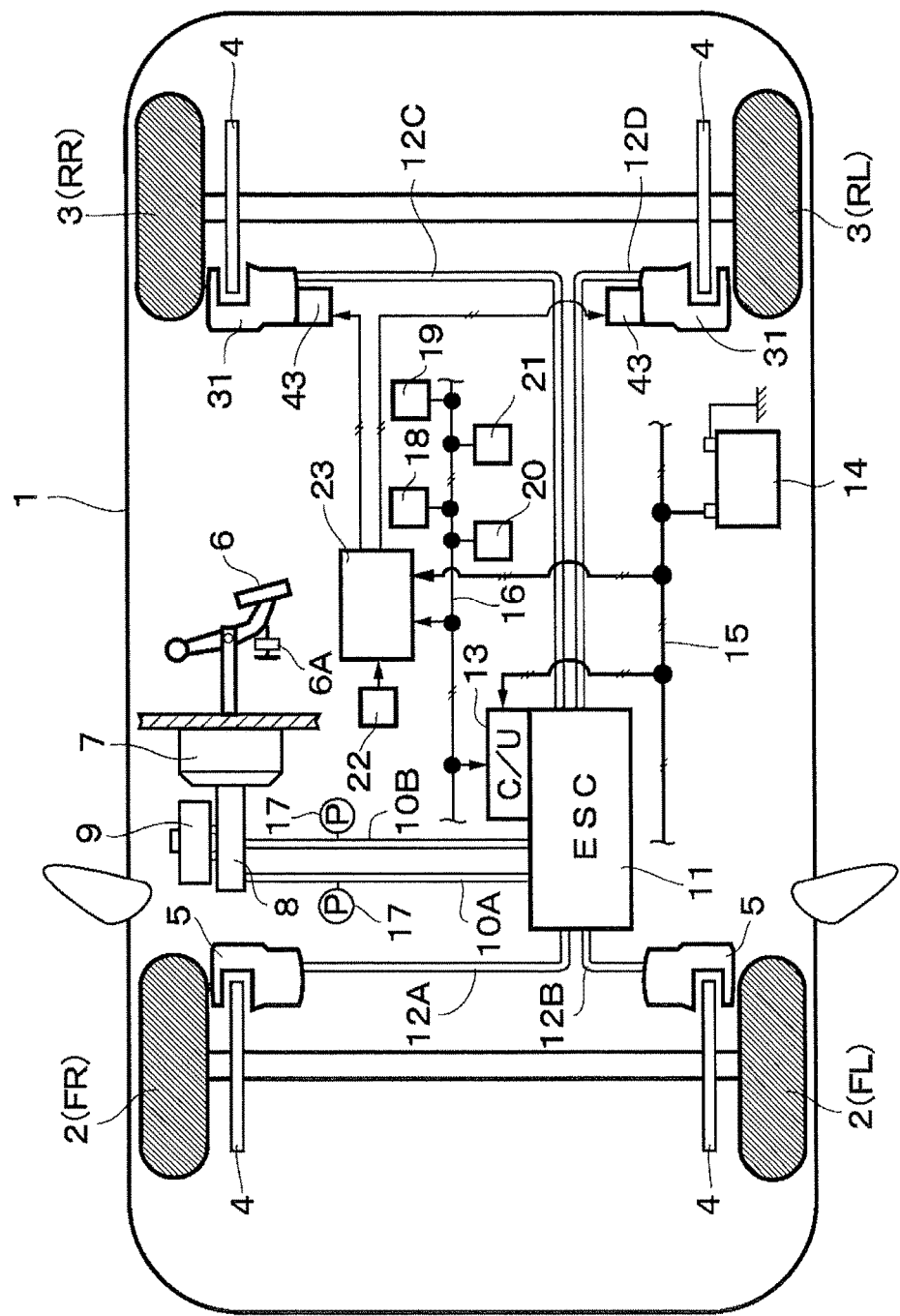
FIG. 1 is a conceptual view of a vehicle with a brake apparatus according to an embodiment of the present invention.

In FIG. 1, a vehicle body 1, which constitutes a body of a vehicle, has four wheels, i.e., left and right front wheels 2 (FL, FR) and left and right rear wheels 3 (RL and RR) on the bottom (road) side of the body 1. Each of the front wheels 2 and rear wheels 3 is provided with a disc rotor 4 serving as a rotor (rotating member) that rotates with the respective wheel (any one of the front and rear wheels 2 and 3). The disc rotors 4 for the front wheels 2 are each arranged for a hydraulic disc brake 5 with a part of the disc rotor being inserted in the hydraulic disc brake, and those for the rear wheels 3 each arranged for a hydraulic disc brake 31 with an electric parking brake function, a part of the disc rotor being inserted in the hydraulic disc brake. The wheels (front wheels 2 and rear wheels 3) are thus subjected to braking force, independent of each other.

The vehicle body 1 is provided with a brake pedal 6 on the front board side thereof. For braking operation, the driver steps on or press the brake pedal 6 to apply and release braking force as a regular brake (service brake). The brake pedal 6 has a brake operation sensor (brake sensor) 6A, such as a brake lamp switch, a pedal switch, and a pedal stroke sensor. The brake operation sensor 6A senses any stepping or pressing operation on the brake pedal 6 and the degree of pressing and sends a corresponding detection signal to a controller 13 for hydraulic-pressure supply apparatus or hydraulic pressure feeder. The detection signal from the brake operation sensor 6A is transmitted, for example, through a vehicle data bus 16 or a signal line (not shown) connecting the controller 13 for hydraulic-pressure supply apparatus to a parking brake controller 23 (to send the signal to the brake controller 23).

The force on the brake pedal 6 is transmitted via a brake booster 7 to a master cylinder 8, functioning as a hydraulic pressure source. The brake booster 7 comprises a negative-pressure booster, a motor booster, or the like between the brake pedal 6 and the master cylinder 8, so as to multiply pressing force on the brake pedal 6 and transmit the multiplied force to the master cylinder 8. The master cylinder 8 uses brake fluid supplied by a master reservoir 9 to generate hydraulic pressure. The master reservoir 9 functions as a work fluid tank containing brake fluid. The mechanism configured to generate hydraulic pressure in response to the brake pedal 6 is not limited to the above-described mechanism and may be a mechanism that generates hydraulic pressure according to the operation of the brake pedal 6, such as a brake-by-wire mechanism.

Hydraulic pressure generated in the master cylinder 8 is transmitted, for example, via a pair of cylinder-side hydraulic pipes 10A, 10B to a hydraulic-pressure supply apparatus 11 (ESC 11). The ESC 11 distributes hydraulic pressure from the master cylinder 8 to each disc brake 5, 31 via brake-side pipes 12A, 12B, 12C, and 12D. This results in application of braking force to the wheels (front and rear wheels 2 and 3) individually.

The ESC 11 is located between the disc brakes 5 and 31 and the master cylinder 8. The ESC 11, whether or not it generates pressure according to the operation of the brake pedal 6, feeds hydraulic pressure to the disc brakes 5 and 31, i.e., boosts hydraulic pressure on the disc brakes 5 and 31. The ESC 11 has a controller 13 for hydraulic-pressure supply apparatus for controlling the ESC 11 (hereinafter "control unit 13"). By operating and controlling the ESC 11, the control unit 13 increases, decreases, and maintains hydraulic braking pressure on the disc brakes 5 and 31 via the brake-side pipes 12A-12D. This enables various modes of brake control, including, for example, boost control, braking-force distribution control, brake assist control, antilock brake control (ABS), traction control, vehicle stabilizing control (including antiskid), and hill start aid control.

The control unit (controller) 13 has a microcomputer. Electric power is sent from a battery 14 via a power line 15 to the control unit 13. The control unit 13 is connected to the vehicle data bus 16, as shown in FIG. 1. The ESC 11 can be replaced with a known ABS unit or may be dispensed with by directly connecting the master cylinder 8 to the brake-side pipes 12A-12D.

The vehicle data bus 16 has a controller area unit (CAN), serving as a serial communication unit mounted in the vehicle body 1, to permit multichannel communications within the vehicle between various vehicle electronic devices, the control unit 13, the parking brake controller 23, etc. Vehicle data sent through the vehicle data bus 16 includes, for example, data represented by detection signals from a brake-operation detection sensor 6A, an ignition switch, a seat belt sensor, a door lock sensor, door open sensor, seat sensor, a vehicle speed sensor, a steering-angle sensor, an accelerator sensor (accelerator-pedal sensor), a throttle sensor, an engine-speed sensor (engine rotational number sensor), a stereo/camera, a millimeter-wave radar, a pressure sensor 17, a slope sensor 18, a shift sensor 19, an acceleration sensor 20, a wheel-speed sensor 21, a pitch sensor for sensing any pitch of the vehicle, etc.

The pressure sensor 17, sensing the hydraulic pressure in the master cylinder, is located on each cylinder-side hydraulic-pressure pipe 10A, 10B between the master cylinder 8 and the ESC 11. The pressure sensor 17 may be provided on each of the brake-side pipes 12A, 12B, 12C, and 12D to individually sense the (hydraulic) pressure in the respective pipe, in other words the hydraulic pressure (cylinder hydraulic pressure) in a caliper 34 (cylinder portion 36) corresponding to the respective pipe.

The slope sensor 18, a slope detector, is mounted in the vehicle body 1 to sense the slope of the place (road surface) on which the vehicle is located, in other words the slope of the vehicle, and sends a slope signal accordingly. The slope sensor 18 may be an inclination sensor, an acceleration sensor, or a gyroscopic sensor. In the case the slope sensor 18 is constituted by an acceleration sensor, the acceleration sensor 20 may double as (or be combined with) the slope sensor 18.

The shift sensor 19, a gear position detector, is provided in a vehicle transmission or a shift lever (a select lever or a select switch) to detect the position of the vehicle gear, namely a selected position of the vehicle transmission, or a corresponding selected position of the shift lever. The shift sensor 19, also called a transmission sensor, a shift switch, or a select switch, transmits a gear position signal indicative of a gear position (shift lever position) selected by the driver: parking (P), neutral (N), drive (D), reverse (R), low (L), second (S), or other shift lever positions (e.g., from first to seventh).

The acceleration sensor (G sensor) 20, an acceleration detector, is mounted in the vehicle body 1 to sense vehicle acceleration, such as longitudinal acceleration, and send an acceleration signal accordingly. The wheel-speed sensor 21, as a wheel-speed detector, is provided in a wheel bearing unit (not shown) supporting, for example, the wheel 2 or 3 rotatably to sense the rotational speed (wheel speed) of the wheel 2 or 3 and send a wheel speed signal accordingly.

The vehicle body 1 is provided with a parking brake switch 22 next to the driver's seat (not shown). The parking brake switch 22 is operated by the driver. The parking brake switch 22 transmits a signal (operation command signal) corresponding to a parking-brake command (application command or release command) from the driver, to the parking brake controller 23. That is, the parking brake switch 22 transmits the signal (application command signal or release command signal) for applying or releasing a brake pad 33 on the basis of the operation (rotation) of the electric motor 43B, to the parking brake controller 23.

When the driver has turned the parking brake switch 22 on for brake application (parking brake ON side), that is, has sent an application command (retaining command, operation command) for applying braking force to the vehicle, the parking brake switch 22 outputs the application commend. In this case, electric power is transmitted to the disc brakes 31 for the rear wheels 3 via the parking brake controller 23 to rotate the electric motor 43B for braking. This puts the brakes 31 for the rear wheels 3 in a state of brake application, in which the disc brakes 31 are subjected to braking force to serve as parking brakes (or auxiliary brakes).

When the driver has turned the parking brake switch 22 on for brake release (parking brake OFF side), that is, has sent a release command for release of braking force from the vehicle, the parking brake switch 22 outputs an release command. In this case, electric power is transmitted to the disc brakes 31 via the parking brake controller 23 to rotate the electric motor 43B in the reverse direction to that for braking. This puts the disc brakes 31 for the rear wheels 3 in a release state, in which the disc brakes 31 are released from parking (or auxiliary brake) braking force.

The parking brakes may be configured to automatically apply braking force (perform automatic application) in response to an application command automatically sent according to a parking-brake application determination logic in the parking brake controller 23, for example, when the vehicle is brought to halt (e.g., when the vehicle, decelerating, has been moving at less than 4 km/h for a predetermined length of time), when the engine is turned off, when the shift lever is put in P, when a door has been opened, or when a seat belt is unbuckled. Similarly, the parking brakes may be configured to automatically release braking force (perform automatic release) in response to an automatic release command according to a parking-brake release determination logic in the parking brake controller 23, for example, when the vehicle is moving (the vehicle accelerates from rest and moved at 5 km/h or greater for predetermined time), when the accelerator pedal or the clutch pedal is stepped on, or when the shift lever is put in a position other than P or N.

In response to an application command from the parking brake switch 22 while the vehicle is moving, i.e., a command for dynamic parking brakes (dynamic application) for use of the parking brakes as auxiliary brakes in an emergency condition while the vehicle is moving, etc., the parking brake controller 23 may be configured to determine whether the wheels (rear wheels 3) are locked (or slipping), and automatically apply or release braking force (ABS control), depending on an application or release command made according to the condition of the wheels (whether they are locked).

Figure 2:
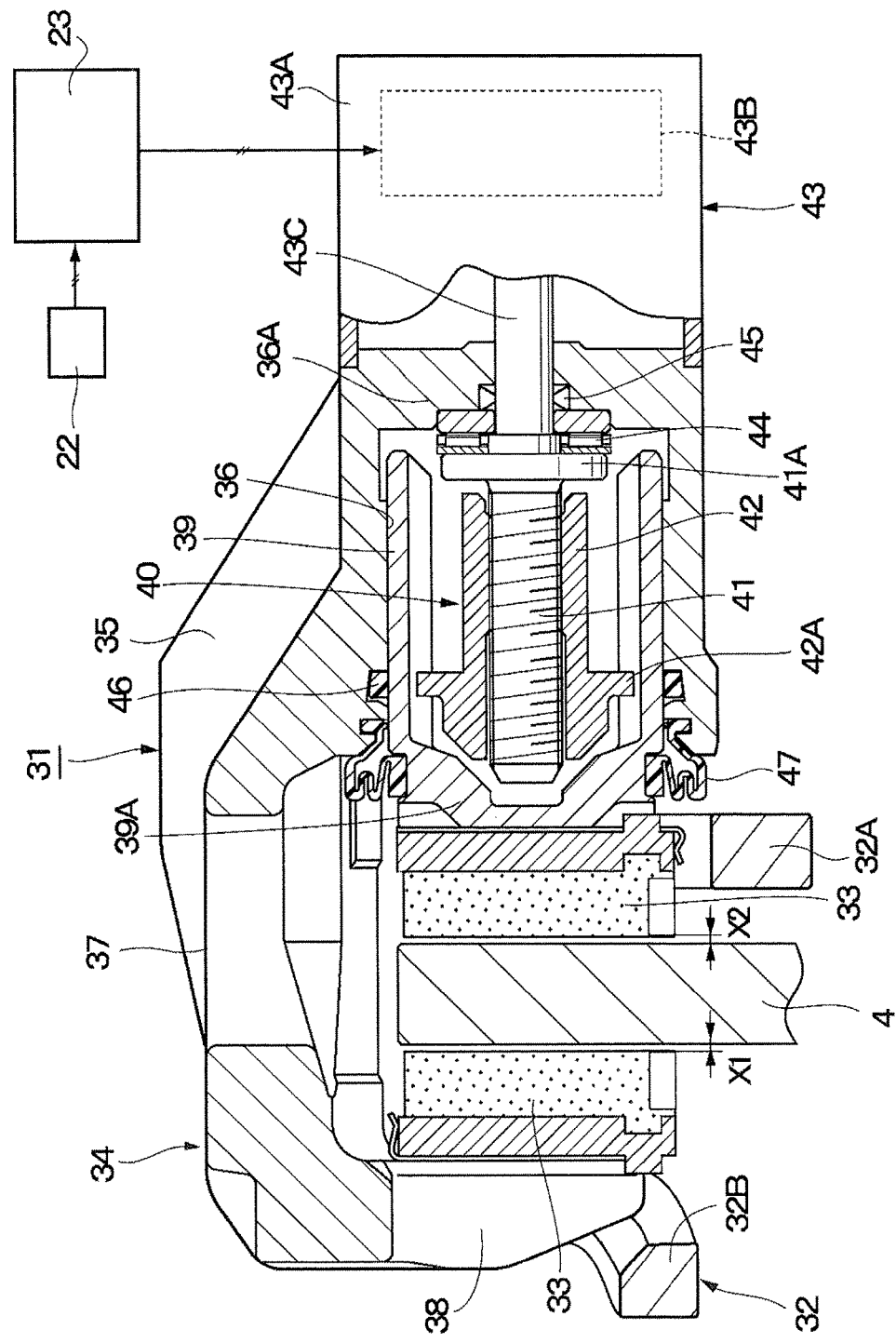
FIG. 2 is an enlarged longitudinal cross-sectional view of a disc brake having an electric parking brake function at a rear wheel of FIG. 1.

Next, the structure of the disc brakes 31, 31 with an electric parking brake function for the left and right wheels 3, 3 is described with reference to FIG. 2. Here, FIG. 2 shows only one of the right and left disc brakes 31, 31 for the right and left rear wheels 3, 3.

The pair of disc brakes 31 for the right and left wheels of the vehicle are of hydraulic type with an electric parking brake function. The disc brakes 31, together with the parking brake controller 23, form a brake system (brake apparatus). Each disc brake 31 comprises: a mounting member 32 attached to a non-rotatable portion at the respective rear wheel 3 side of the vehicle; an inner and an outer brake pad 33 serving as friction members; and a caliper 34 as a brake mechanism with an electric actuator 43.

The disc brake 31 thrusts brake pads 33 by a piston 39 with hydraulic pressure, for example, in response to the condition of the brake pedal 6 being stepped on, so as to press the brake pads 33 on the disc rotor 4 for application of braking force on the wheel (rear wheel 3). Further, the disc brake 31, upon receiving an operation command in the form of a signal from the parking brake switch 22 or an operation command based on the above-described parking-brake ON/OFF determination logic or ABS control, thrusts the piston 39 (via a rotary-to-linear motion converter 40) with the aid of the electric motor 43B to press the brake pads 33 against the disc rotor 4 for application of braking force on the wheel (rear wheel 3).

The mounting member 32 comprises: a pair of arms (not shown) extending in the axial direction of the disc rotor 4 (disc axis) to straddle the outer edge of the disc rotor 4 and spaced apart from each other along the circumference of the disc; a thick support 32A integrally connecting the base ends of the arms and fixed on the inside of the disc rotor 4 to the non-rotatable portion of the vehicle; and a support beam 32B interconnecting tips of the arms on the outside of the disc rotor 4.

The inner and outer brake pads 33 are disposed to come into contact with the opposite sides of the disc rotor 4 and supported by the arms of the mounting member 32 to move along the disc axis. The outer and inner brake pads 33 are pressed by the caliper 34 (caliper body 35 and piston 39) against the opposite sides of the disc rotor 4, causing the brake pads 33 to press the disc rotor 4 rotating with the wheel (rear wheel 3) for application of braking force on the vehicle.

The mounting member 32 is provided with a caliper 34, serving as a wheel cylinder, so as straddle the outer circumference of the disc rotor 4. The caliper 34 comprises: a caliper body 35 supported to move along the axis of the disc rotor 4 relative to the arms of the mounting member 32; a piston 39 provided in the caliper body 35; a rotary-to-linear motion converter 40; an electric actuator 43, etc. The caliper 34 uses the piston 39, moved by hydraulic pressure generated according to the operation of the brake pedal 6, to thrust the brake pads 33.

The caliper body 35 comprises a cylinder portion 36, a bridge portion 37, and a claw portion 38. The cylinder portion 36 is of tubular shape closed at one axial end by a partition wall 36A and open at the other end, facing the disc rotor 4. The bridge portion 37 extends from the cylinder portion 36 along the disc axis to straddle the outer circumference of the disc rotor 4. The claw portion 38 is disposed on the opposite side to the cylinder portion 36 and extends radially inward from the bride portion 37.

The cylinder portion 36 of the caliper body 35 is supplied with hydraulic pressure via a brake-side pipe 12C or 12D of FIG. 1, for example, when the brake pedal 6 is stepped on. The cylinder portion 36 is formed integral with the partition wall 36A, which is located between the cylinder portion 36 and the electric actuator 43. The partition wall 36 has an axial through-hole and receives therein a rotatable output shaft 43C of the electric actuator 43.

The cylinder portion 36 of the caliper body 35 contains the piston 39 as a movable member, and the rotary-to-linear motion converter 40. In this embodiment, the rotary-to-linear motion converter 40 is accommodated in the piston 39, but its accommodation in the piston 39 is not required as long as it can thrust the piston 39.

The piston 39 moves the brake pads 33 toward and away from the disk rotor 4. The piston 39 is open on one side in the axial direction and closed on the other side, facing the inner brake pad 33, by a cover 39A. The piston 39, located in the cylinder 36, moves when current is applied to the electric actuator 43 (electric motor 43B) or when hydraulic pressure is introduced into the cylinder portion 36, for example by the brake pedal being stepped on. Such movement of the piston 39 by the electric actuator 43 (electric motor 43B) is made by a linear-motion member 42 whet it presses the piston 39. The rotary-to-linear motion converter 40 is located in the piston 39, which piston is configured to move along the axis of the cylinder portion 36 by the rotary-to-linear motion converter 40.

The rotary-to-linear motion converter 40 uses external force exerted by the electric actuator 43, not force applied in the form of hydraulic pressure into the cylinder 36, to thrust the piston 39 of the caliper 34 and also keep or maintain the piston 39 and the brake pads 33 in thrust state. This puts the parking brakes into a state of brake application (a state of retaining). The rotary-to-linear motion converter 40 also moves the piston 39 in reverse direction with the aid of the electric actuator 43 to release the parking brakes (release state). Since the right and left disc brakes 31 are provided for the right and left rear wheels 3 respectively, the rotary-to-linear motion converter 40 and the electric actuator 43 are provided for right and left sides of the vehicle. In this embodiment, the rotary-to-linear motion converter 40 serves as a thrust retaining mechanism. The electric actuator 43 and the rotary-to-linear motion converter 40 may also be provided therebetween with a reducer to form a thrust retaining mechanism.

The rotary-to-linear motion converter 40 comprises: a screw member 41 having a rod-shaped body with male threads of trapezoidal shape or the like; and a linear-motion member 42 (serving as spindle nut mechanism) having a hole with trapezoidal female threads on its inner circumferential side. The linear-motion member 42 is a movable member (thrust member) that is moved toward and away from the piston 39 by the electric actuator 43. The screw member 41, meshing with the inner circumferential side of the linear-motion member 42, forms a screw mechanism that converts rotary motion generated by the electric actuator 43 into linear motion of the screw member 42. The female threads of the linear-motion member 42 and the male threads of the screw member 41 are threads of high irreversibility, trapezoidal ones in this embodiment, to form a thrust retaining mechanism.

The rotary-to-linear motion converter 40 (thrust retaining mechanism) uses frictional force (retaining force) to keep the linear-motion member 42 (i.e., piston 39) at a certain position even when current application to the electric motor 43B is stopped. The thrust retaining mechanism may be anything other than a trapezoidal thread, for example, a triangular thread of high irreversibility or a worm gear, so long as it can retain the piston 39 at the position to which the piston 39 is moved or thrust by the electric actuator 43.

The screw member 41, meshing with the inner circumferential side of the linear-motion member 42, is provided with a flange portion 41A, a flange, of large diameter at one axial end of the screw member 41, and the other axial end of the screw member 41 extends toward the cover 39A of the piston 39. The screw member 41 is integrally connected at the flange portion 41A to the output shaft 43C of the electric actuator 43. The linear-motion member 42 has an engaging projection 42A on its outer circumferential side that permits relative motion of the linear-motion member 42 to the piston 39 in the axial direction while preventing its rotation relative to the piston 39 (preventing relative rotation).

The electric actuator 43, fixed to the caliper body 35 of the caliper 34, operates (applies and releases) the disk brake 31 on the basis of an operation command signal from the parking-brake switch 22 or the parking-brake application/release determination logic/ABS control. The electric actuator 43 comprises: a casing 43A mounted on the outside of the partition wall 36A; an electric motor 43B having a stator, a rotor, etc., provided in the casing 43A and moving the piston 39 when it is supplied with power (when current is applied to it); a reducer (not shown) for amplifying torque from the electric motor 43B; and an output shaft 43C for outputting amplified rotary torque. The electric motor 43B is, for example, a DC brush motor. The output shaft 43C extends in the axial direction through the partition wall 36A of the cylinder portion 36, in which the output shaft 43C is connected to an end of the flange portion 41A of the screw member 41 to rotate with it.

The output shaft 43C and the screw member 41 are connected by connecting means that moves in the axial direction but is prevented from rotating. Such connecting means is, for example, known spline-fitting, polygonal (non-circular) fitting, or the like. The reducer may be, for example, a planetary-gear reducer or a worm-gear reducer. A worm-gear reducer or other known (irreversible) reducer incapable of reverse motion may be used with a known reversible mechanism, such as a ball screw or a ball and ramp mechanism, as the rotary-to-linear motion converter 40. Such a reversible rotary-to-linear motion converter, for example, and the irreversible reducer form a thrust retaining mechanism.

Figure 3:
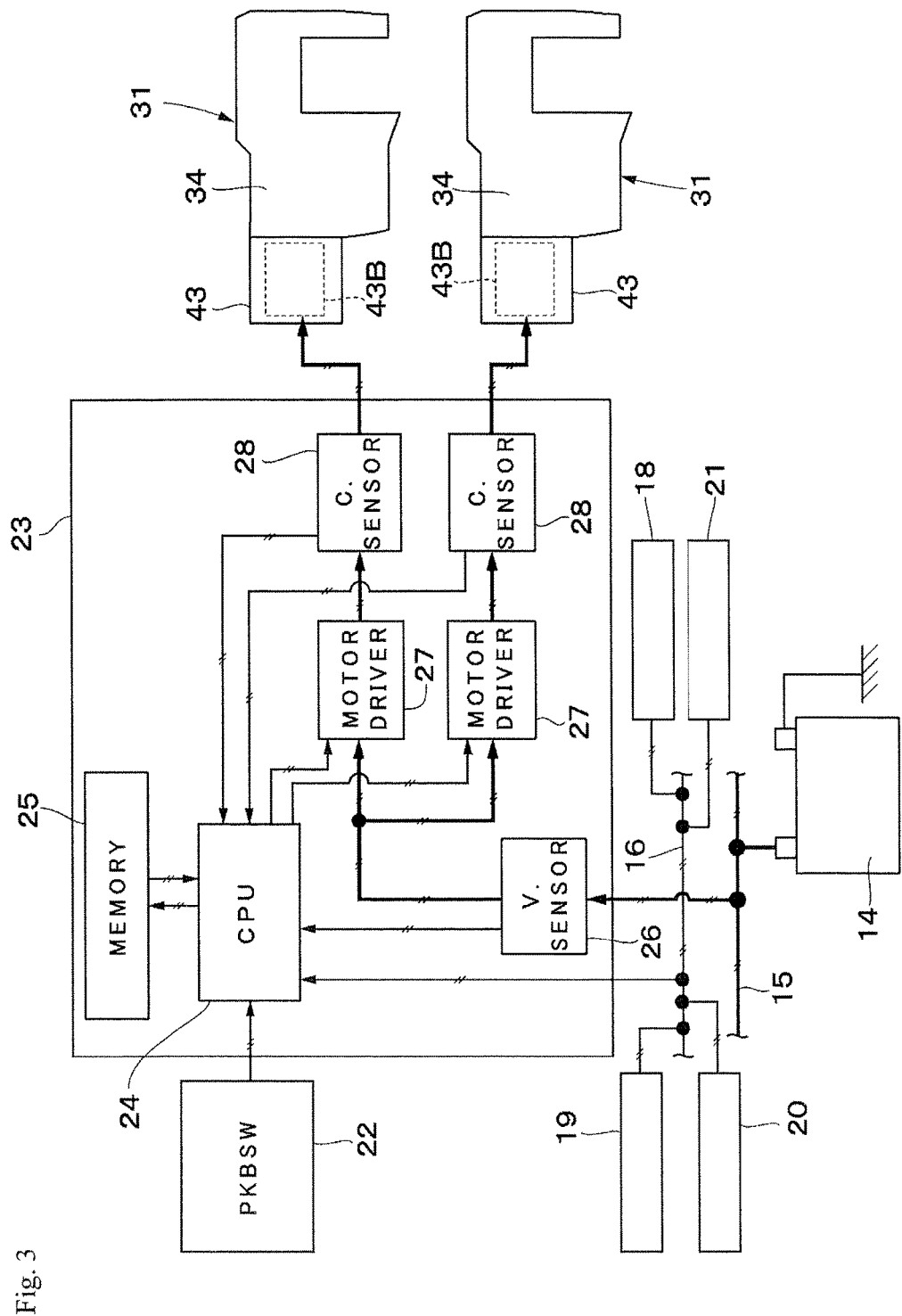
FIG. 3 is a block diagram of a parking brake controller of FIG. 1.

Upon the driver's turning on of the parking brake switch 22 of FIGS. 1 to 3, current is applied to the electric motor 43B through the parking-brake controller 23 to rotate the output shaft 43C of the electric actuator 43. In this way, the screw member 41 of the rotary-to-linear motion converter 40 rotates in one direction with the output shaft 43C to thrust (drive) the piston 39 via the linear-motion member 42 toward the disc rotor 4. This causes the disc brake 31 to hold the disc rotor 4 between the inner and outer brake pads 33, serving as an electric parking brake applying braking force, a state of brake application (a state of retaining).

When the parking-brake switch 22 is operated for brake release, the electric actuator 43 rotates the screw member 41 of the rotary-to-linear motion converter 40 in the other direction (reverse direction). In this operation, the linear-motion member 42 (and piston 39 in the absence of hydraulic pressure being applied) is moved away from the disc rotor 4 to release braking force for parking of the disc brake 31, that is, to put the disc brake 31 into a release state.

In the rotary-to-linear motion converter 40, when the screw member 41 moves relative to the linear-motion member 42, rotation of the linear-motion member 42 in the piston 39 is restricted, such that the linear-motion member 42 undergoes relative motion in the axial direction according to the angle by which the screw member 41 rotates. This causes the rotary-to-linear motion converter 40 to convert rotary motion into linear motion, which in turn causes the liner-motion member 42 to thrust the piston 39. At the same time, the rotary-to-linear motion converter 40 utilizes frictional force on the screw member 41 to hold the liner-motion converter 42 in certain position and thereby retain the position of the piston 39 and the brake pads 33 thrust by the electric actuator 43.

The partition wall 36A of the cylinder portion 36 has a thrust bearing 44 between the partition wall 36A and the flange portion 41A of the screw member 41. The thrust bearing 44 receives a thrust load from the partition wall 36A and the screw member 41 and makes smooth rotation of screw member 41 relative to partition wall 36A. The partition wall 36A of the cylinder portion 36 is provided with a seal member 45 between the partition wall 36A and the output shaft 43 of the electric actuator 43. The seal member 45 seals the cylinder portion 36 and electric actuator 43 from each other to prevent leakage of brake fluid in the cylinder portion 36 into the electric actuator 43.

The cylinder portion 36 is provided, at its open end, with a piston seal 46, an elastic seal for sealing between the cylinder portion 36 and the piston 39, and a dust boot 47 for preventing entry of foreign substances into the cylinder portion 36. The dust boot 47 is a flexible bellows-like seal member provided between the open end of the cylinder portion 36 and the outer circumference of the cover 39A of the piston 39.

The disc brakes 5 for the front wheels 2 are substantially the same in structure as the disc brakes 31 for the rear wheels 3, except for the parking brakes. More specifically, the disc brakes 5 for the front wheels 2 have none of the rotary-to-linear motion converter 40, electric actuator 43, etc., of the disc brakes 31 for the rear wheels 3, functioning as parking brakes. However, instead of the use of the disc brakes 5, the front wheels 2 may be provided with the disc brakes 31 having an electric parking-brake function.

This embodiment has so far been described with an example of the hydraulic disc brakes 31 with the electric actuators 43. The brake mechanism used in this embodiment may be any other brake mechanism, such as an electric disc brake having an electric caliber, an electric drum brake that presses a shoe against a drum with the aid of an electric actuator for brake application, or a disc brake having a parking brake of electric drum type, an a structure using an electric actuator to pull a cable for parking brake application, so long as it presses (thrusts) friction members (a pad, a shoe) against rotary members (a rotor, a drum) by an electric actuator (electric motor) and keep the pressure on.

The brake apparatus for a four-wheel vehicle according to this embodiment operates in the following manner.

When the driver of the vehicle steps on the brake pedal 6, the force on the pedal 6 is transmitted via the brake booster 7 to the master cylinder 8, and in turn the master cylinder 8 generates brake fluid pressure. The hydraulic pressure generated in the master cylinder 8 is distributed through the cylinder-side hydraulic pipes 10A, 10B, the ESC 11, and the brake-side hydraulic pipes 12A, 12B, 12C, and 12D to the disc brakes 5, 31 to apply braking force to the right and left front wheels 2 and the right and left rear wheels 3.

The disc brakes 31 for the rear wheels 3 operate in the following manner. As hydraulic pressure is transmitted via the brake-side pipes 12C, 12D into the cylinder portion 36 of the caliper 34 to raise the hydraulic pressure in the cylinder portion 36, the piston 39 slides toward the inner brake pad 33 and thus presses it against one side of the disc rotor 4. This causes reaction force that urges the caliper 34 as a whole to slide inwards relative to the arms of the mounting member 32.

As a result, an outer leg (claw 38) of the caliper 34 acts to press the outer brake pad 33 against the disc rotor 4, which is thus held between the axially opposite sides by the pair of brake pads 33 for hydraulic application of braking force. In a brake release operation, transmission of hydraulic pressure into the cylinder portion 36 is stopped to move the piston 39 back into the cylinder portion 36, separating the inner and outer brake pads 33 from the disc rotor 4 to put the vehicle back into a non-braking state.

Next, the driver's operation to put the parking-brake switch 22 into braking operation (ON) causes the parking-brake controller 23 to supply electric power to the motor 43B of the disc brake 31 and thus rotate the output shaft 43C of the electric actuator 43. The disc brake 31 having an electric parking-brake function converts rotary motion of the electric actuator 43 via the screw member 41 of the rotary-to-linear motion converter 40 into linear motion of the linear-motion member 42, which in turn moves in the axial direction and presses the piston 39, thereby pressing the pair of brake pads 33 against the opposite surfaces of the disc rotor 4.

At this stage, the linear-motion member 42 is kept in braking state by frictional force (retaining force) generated between the linear-motion member 42 and the screw member 41, the frictional force generated due to the pressing reaction force from the piston 39 as normal force, which puts the disc brakes 31 for the rear wheels 3 into parking brake operation (application). In other words, even after the supply of electric power to the electric motor 43B is stopped, the female screw of the linear-motion member 42 and the male screw of the screw member 41 keep the linear-motion member 42 (and thus the piston 39) in braking position.

The driver's operation of the parking-brake switch 22 for brake release (OFF) causes transmission of electric power from the parking-brake controller 23 to the electric motor 43B to turn it in reverse direction and thus rotate the output shaft 43C of the electric actuator 43 in the opposite direction to that for putting the parking brake into operation (for brake application). This releases braking force exerted by the screw member 41 and the linear-motion member 42, causing the rotary-to-linear motion converter 40 to move the linear-motion member 42 back into the cylinder portion 36 by a distance corresponding to the degree of reverse rotation of the electric actuator 43 for release of braking force exerted by the parking brake (disc brake 31).

The parking-brake controller 23, together with the pair of right and left disc brakes 31, forms an electric brake system (brake apparatus). As shown in FIG. 3, the parking brake controller 23 has an operational circuit (CPU) 24 comprising a microcomputer, etc. and is supplied with electric power from a battery 14 via a power line 15.

The parking brake controller 23 forms a control device (controller, control unit) controlling the electric motor 43B of the disc brake 31 to exert braking force (parking brake, auxiliary brake) at the time of vehicle parking or stop (if necessary, while moving). The parking brake controller 23 drives the electric motor 43B, thereby operate (apply or release) the disk brakes 31 as a parking brake (or auxiliary brake, if necessary).

The parking brake controller 23, according to an operation command (application or release command) made by the driver's operation of the parking brake switch 22, turns the electric motor 43B on to apply (and keep on) or release the disc brakes 31. The parking brake controller 23 applies or releases the disc brakes 31 by turning on the electric motor 43B on the basis of an operation command through a parking-brake application/release determination logic. The parking brake controller 23 also applies or releases the disc brakes 31 by turning on the electric motor 43B on the basis of an operation command by ABS control. At this stage, in the disc brakes 31 the rotary-to-linear motion converter 40 (thrust retaining mechanism) engages or releases the piston 39 and the brake pads 33 according to operation of the electric motor 43B.

As described above, in this embodiment, the command for brake operation of the vehicle (brake application or release command) is either manually made with the parking-brake switch 22 or automatically made with the application/release determination logic of the parking brake controller 23 or by ABS control. In other words, in this embodiment, the parking-brake switch 22 and/or parking-brake controller 23 constitutes a command generator configured to generate an application command for applying braking force on the vehicle and a release command for releasing the force. The parking brake controller 23 has an executing unit for executing a command, received from the command generator, by applying current to the electric motor 43B, according to the command.

As shown in FIGS. 1 to 3, the parking brake controller 23 is connected at its input end to the parking-brake switch 22 and at the output side to the electric motor 43B of the disc brakes 31. More specifically, as shown in FIG. 3, the operational circuit (CPU) 24 of the parking-brake controller 23 is connected to the parking-brake switch 22, the vehicle data bus 16, a voltage sensor 26, a motor drive circuit 27, and a current sensor 28, etc., as well as to a memory 25. A variety of items of data, state quantities required for parking brake control (operation) can be obtained through the vehicle data bus 16.

Alternatively, such vehicle data coming from the vehicle data bus 16 may be obtained by directly connecting relevant sensors to the parking brake controller 23 (its operational circuit 24).

The operational circuit 24 of the parking brake controller 23 may be structured to receive an operation command on the basis of the above-described determination logic or ABS controller, from other controllers (e.g., the control unit 13) connected to the vehicle data bus 16. In this way, the determination for applying or releasing parking brake on the basis of the determination logic, or the ABS control can be performed, not by the parking brake controller 23, but by the control unit 13 or other controller. In other words, the control by the parking-brake controller 23 can be incorporated into the control unit 13.

The parking-brake controller 23 has a memory 25 (see FIG. 3) comprising, for example, a flash memory, ROM, RAM, EEPROM, or the like. In addition to a program for the determination logic for applying or releasing parking brake and ABS control, the memory 25 stores a processing program for executing a processing flow as shown in FIG. 6 or a processing program for release control or the like. The memory 25 also stores a variety of reference values (mask time, set values, set periods) for the processing program or the like.

In this embodiment, the parking-brake controller 23 is separate from the control unit 13 of the ESC 11, but can instead be integrated with it. The parking-brake controller 23 in this embodiment controls the right and left disc brakes 31, but can instead be provided for each of the disk brakes 31. This permits integration of the parking-brake controller 23 with the respective disc brakes 31.

As shown in FIG. 3, the parking-brake controller 23 contains a voltage sensor 26 configured to detect voltage through the power line 15, right and left drive circuits 27, 27 configured to operate the right and left electric motors 43B, 43B, right and left current sensors 28, 28 configured to detect motor currents through the right and left electric motors 43B, 43B, etc. The voltage sensor 26, motor drive circuits 27, current sensors 28 are connected to the operational circuit 24.

The operational circuit 24 of the parking brake controller 23 is thus configured to determine the engagement/disengagement of the disc rotor 4 and the brake pads 33, the OFF state of the electric motors 43 (whether brake application or release is completed), etc., on the basis of changes in motor current through the electric motors 43B detected by the current sensors 28, 28 for brake application or release.

Figure 4:
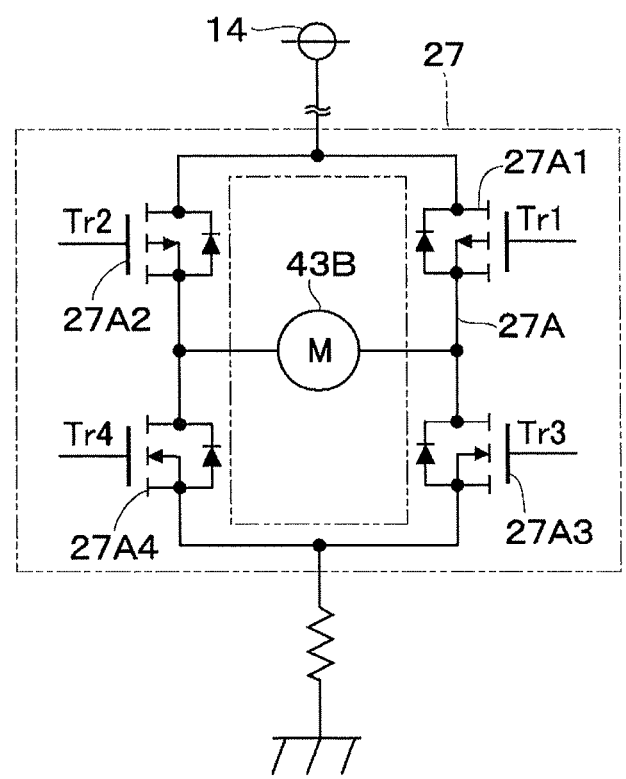
FIG. 4 is a circuit diagram of a motor drive circuit and an electric motor of FIG. 2.

As shown in FIG. 4, the right and left motor drive circuits 27, 27 comprise H bridge circuits 27A, provided with, for example, four semiconductor switches with field-effect transistors (FET), that is, a first switch (Tr1) 27A1, a second switch (Tr2) 27A2, a third switch (Tr3) 27A3, a fourth switch (Tr4) 27A4. The switches 27A1 to 27A4 are turned on (connection) and off (disconnection) according to a command from the operational circuit 24. In other words, current applications to the electric motors 43B are switched on and off by the switches 27A1 to 27A4 of the H bridge circuit 27A.

For example, the electric motors 43B are operated for brake application by turning the first switch 27A1 on, the second switch 27A2 off, the third switch 27A3 off, and the fourth switch 27A4 on (Tr1: ON, Tr2: OFF, Tr3: OFF, Tr4: ON). The electric motors 43B are operated for brake release by turning the first switch 27A1 off, the second switch 27A2 on, the third switch 27A3 on, and the fourth switch 27A4 off (Tr1: OFF, Tr2: ON, Tr3: ON, Tr4: OFF).

Turning off all of the switches 27A1 to 27A4 turns off the electric current to the electric motors 43B (OFF state) (Tr1: OFF, Tr2: OFF, Tr3: OFF, Tr4: OFF). Turning on the first and second switches 27A1 and 27A2 while turning off the third and fourth switches 27A3 and 27A4 applies motor brakes or provides braking force to the electric motors 43B (Tr1: ON, Tr2: ON, Tr3: OFF, Tr4: OFF).

Turning the first switch 27A1 off, the second switches 27A2 on, the third 27A3 off, and fourth switch 27A4 off result in a downstream OFF state (Tr1: OFF, Tr2: ON, Tr3: OFF, Tr4: OFF). The downstream OFF state can be established simply by turning the third motor 27A3 off in the state in which the electric motors 43 are operating in the direction of brake release.

According to Patent Document 1, electric motors are operated for brake release at 100% duty ratio when the road is level (horizontal) at the time of release, and are operated for release at a duty ratio, for example, 50% on the road inclined downward at a predetermined degree or greater in the direction of vehicle movement. This slows down piston thrust to a lower rate (more gradual thrust reduction) than that on a level road but may make the release operation unsmooth, requiring an excess amount of time for the piston thrust to start decreasing at the time of release, or may impart undue resistance to the vehicle at the end of release, causing the driver and any other occupants to feel resistance to or a hitch in a start of vehicle movement.

Figure 5:
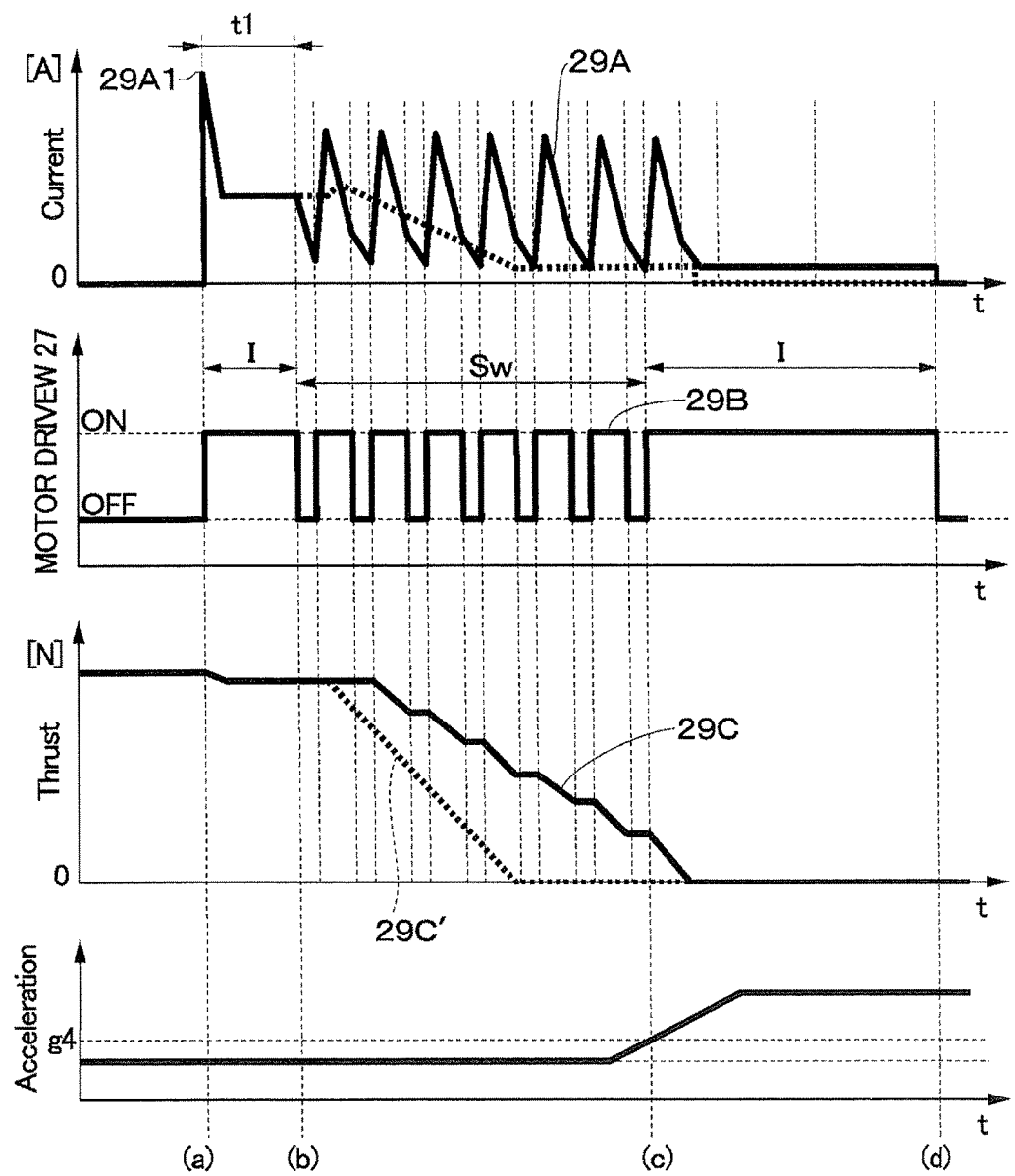
FIG. 5 is a characteristic view of an example of changes with time in motor current at a time of release, switching operation, thrust, and acceleration.

In this embodiment, the parking-brake controller 23 comprises a controller which performs at least following controls after receiving a command for release manually made by the parking-brake switch 22 or a command for release automatically made through the logic for release determination by the parking brake controller 23: current maintenance control which keeps current to the electric motors 43B, and switching control which successively switches between a larger and a small amount of current applied to the electric motors 43B (controls described in S2, S9, S5, S12, S8 of FIG. 6). FIG. 5, relating to the details of this operation, shows changes with time in the current (motor current) to the electric motors 43B at the time of release, switching operation of the motor drive circuit 27, thrust of pistons 39, and vehicle acceleration (G sensor value) detected by the acceleration sensor 20.

As indicated by bold solid lines for characteristics 29A and 29B in FIG. 5, the parking-brake controller 23, upon receiving a release command, performs current maintenance control, in which current is continuously applied to the electric motors 43B, that is, at 100% duty ratio. After this current maintenance control, switching control is performed, in which periodic (intermittent) current application to the electric motors 43 at a duty ratio greater than 0% and lower than 100%. After this switching control, current maintenance control is performed.

More specifically, the parking-brake controller 23, upon receiving a release command at time (a) along the time axis by the parking-brake switch 22 or the release determination logic, performs current maintenance control from time (a) for a first set length of time until time (b). The first set length of time is an amount of time for the current maintenance control at the beginning of release and corresponds to so-called mask time, a standby period for waiting for inrush current 29A1, occurring immediately after the start of operation of the electric motors 43B, to subside or converge.

Time (b) along the time axis following the first set time is when it is determined whether switching control is necessary (S4 in FIG. 6). The determination of whether such switching control is required is made on the basis of the slope detected by the slope sensor 18 and the position of the shift lever detected by the shift sensor 19. Adjustment of the length of the first set time (mask time) enables adjustment of the time at which braking force exerted by the piston 39 at the beginning of release, that is, thrust by the piston 39 at the beginning of release begins to decrease. The first set time is determined in advance in prior experimentation, simulation, computation, or the like to reduce discomfort felt at the time of release and achieve smooth release operation.

Switching control begins if such control is determined to necessary at time (b) along the time axis or at the end of the first set time. The switching control goes on from time (b), the end of the first set time, to time (c), the end of a second set time. The switching control ends when vehicle motion is detected, for example, when a value detected by the acceleration sensor 20 has reached a preset threshold g4 for terminating switching operation.

The second set time is a variable amount of time it takes until a condition for ending the switching control is satisfied, but can instead be set in advance to a constant value (fixed amount) of time for the control. Adjustment of the length of the second set time permits adjustment in time for reducing the rate of reduction in thrust of the piston 39 (the rate of reduction in braking force of the piston 39). The second set time is also determined in advance by prior experimentation, simulation, computation, or the like to reduce discomfort felt at the time of release and achieve smooth release operation.

It a condition for ending the switching operation is satisfied at time (c), the end of the second set time, current maintenance control begins which continues from time (c) on the time axis to time (d) when clearance between the brake pads 33 and disc rotor 4 is obtained.

In FIG. 5, the bold solid line indicates changes with time while current is continuously applied to the electric motors 43B from the receipt of a release command (beginning of release) to the end of the release, that is, during continuous current maintenance is exclusively taking place at 100% duty ratio. As indicated by solid line for characteristic 29C in FIG. 5, during the switching control (0%<duty ratio<100%), it is possible to decrease the rate of reduction of thrust of the piston 39 (the rate of reduction in braking force by the piston 39) (gradually reducing thrust), compared with the characteristic 29C', indicated by a bold dashed line.

During the current maintenance control (duty ratio=100%), it is possible to increase the (rotational) speed of the electric motors 43B to a level greater than that during the switching operation. As such, current maintenance control at the beginning of release can reduce the time it takes until the thrust of piston 39 begins to decrease, compared with that if switching control were performed from the beginning of release. Current maintenance control at the end of release reduces resistance to or a hitch felt by the driver and other occupants at the start of vehicle movement, compared with that if the switching control continued until the completion of release.

The current maintenance control controls the switches 27A1 to 27A4 of the H bridge circuit 27A, a component of the motor drive circuit 27, to keep the current to the electric motors 43B (release ON) for over a set amount of time, that is, to hold the H bridge circuit 27A in the state of release ON (Tr1: OFF, Tr2: ON, Tr3: ON, Tr4: OFF) for over a set time.

The switching control is performed by operating the switches 27A1 to 27A4 of the H bridge circuit 27A to periodically repeat current application (release ON) to the electric motors 43B and interruption of current application (OFF or, as required, downstream OFF, brake). More specifically, the H bridge circuit 27A follows the sequence: release ON (Tr1: OFF, Tr2: ON, Tr3: ON, Tr4: OFF), downstream OFF (Tr1: OFF, Tr2: ON, Tr3: OFF, Tr4: OFF), brake (Tr1: ON, Tr2: ON, Tr3: OFF, Tr4: OFF), and OFF (Tr1: OFF, Tr2: OFF, Tr3: OFF, Tr4: OFF). The sequence of "release ON, downstream OFF, brake, and OFF," which constitutes one cycle, is repeated with a set period. The set time for current maintenance control is set, for example, longer than or equal to the set period of switching control (set time set period).

The switching operation may be, for example, a fixed pulse-width switching control (with a fixed period and a fixed pulse width) that sets the duty ratio between the current application (release ON) to the electric motors 43B and the interruption of current (downstream OFF, brake, and OFF) to a predetermined value (a fixed value greater than 0% and lower than 100%, e.g., 33%, 40%, 50%, or 66%), namely, chronological control switching between the current application (switch ON) to the electric motors 43B and interruption (switch OFF) at regular intervals (periodically, at a predetermined period). In this case, the rate of reduction in the thrust of the piston 39 during switching control is a fixed value corresponding to a predetermined duty ratio (constant value) and is lower than that when the duty ratio is 100%.

Alternatively, the switching control may be a pulse-width modulation switching control (PWM control) with a variable duty ratio greater than 0% and lower than 100% (with a period, and a pulse width, and, if necessary, a number of pulses made variable). This alternative makes it possible to change the rate of reduction in the thrust of the piston 39 by changing the duty ratio, that is, by changing the period, the pulse width, and, if necessary, the number of pulses during the switching control. The PWM control is a current control that reduces the applied current by changing the duty ratio at a high frequency, e.g., 1 kHz (or the period) to reduce output voltage.

Either way, in this embodiment, both of the current maintenance control and the switching control take place in a period from the beginning to the end of one release to make variable the rate of reduction in the thrust of piston 39 (rate of reduction in braking force by piston 39; speed of the electric motors 43B). Such current maintenance control and switching control may be performed, for example, only when the vehicle starts to move or for a vehicle having an automatic transmission (hereinafter referred to as an AT vehicle). Whether the vehicle is an AT vehicle or a vehicle having a manual transmission (MT vehicle), can be determined, for example, from data sent through the vehicle data bus (CAN) 16. (For example, availability of data on the gear position of a shift lever leads to identification of the vehicle as an AT one.)

The current maintenance control and switching control may be performed only at the time of automatic release, in which a release command is generated through the release determination logic in the parking-brake control 23 (not at the time of manual release, in which a release command is generated with the parking-brake switch 22).

Next, release control processing performed by the operational circuit 24 of the parking-brake controller 23 is described with reference to FIG. 6. The release control processing of FIG. 6 repeats at a certain control period, or at regular intervals (e.g., 10 ms), during current application to the parking-brake controller 23.

For example, when the processing operation of FIG. 6 is started by the driver starting system operation, such as turning on of an accessory, ignition, or power source, (start of the vehicle system, start of the parking-brake controller 23), the operational circuit 24 determines in S1 whether a release command is made with the parking brake switch 22 or through the above-described determination logic. In other words, S1 determines whether a release command is generated by the command generator. If "NO" or there is no release command, S1 is repeated. If "yes" or a release command is made, the process goes to S2.

In S2, the electric motors 43B is operated for release (or supplied with power to perform a release). More specifically, the H bridge circuit 27A, a component of the motor drive circuit 27, is turned on for release (Tr1: OFF, Tr2: ON, Tr3: ON, Tr4: OFF) to start current maintenance control. Subsequent S3 determines whether mask time (first set time) has elapsed (mask determination). The mask time is time to wait for inrush current 29A1 occurring immediately after the start of the electric motors 43B to subside and also serves as a standby period to begin a determination of whether to perform a switching control. In subsequent S4 following the end of the mask time, if switching control is determined to be necessary, a switching control is started after the mask time.

If "no" in S3, which means that it is determined that mask time (first set time) has not elapsed, the process goes back and repeats S3. If "yes," which means it is determined that mask time has elapsed, the process goes to S4, which determines whether switching control is necessary, namely, whether to terminate the current maintenance control and begin switching control to prevent a jerk felt (feel of sudden move of the vehicle) on the vehicle or continue the current maintenance control without performing switching control.

More specifically, S4 determines whether to perform switching operation on the basis of an angle of inclination of the vehicle indicated by a slope signal fed by the slope sensor 18 and the position of the shift lever indicated by a gear position signal fed by the shift sensor 19. As such, the rate of reduction in the thrust of the piston 39 (the rate of reduction in braking force by the piston 39) varies, depending on whether the current maintenance continues (fast) or terminates and begins switching control (slow). The rate of thrust reduction when the absolute value of an angle of inclination of the vehicle as indicated by a slope signal is less than a set angle is made lower than that when the absolute value is greater than or equal to the set value and the movement of the vehicle is downward. In other words, switching control is performed when the absolute value of a vehicle inclination angle as indicated by a slope signal is greater than or equal to the set angle and the movement of the vehicle is downward, so as to reduce the rate of thrust reduction.

For this purpose, S4 determines whether the slope signal is greater than or equal to the first set value and the shift lever is in reverse (R) or the slope signal is lower than or equal to the second set value and the shift lever is in a forward position (D, L, S, or other shift lever positions). The slope or the angle of vehicle inclination is defined, for example, as zero where the road surface is level (horizontal), or the vehicle is horizontal, negative (minus) where the front of the vehicle is inclined downward (on a downgrade), and positive (plus) where the front of the vehicle is inclined upward (on an upgrade).

With this definition, when the slope signal is greater than or equal to the first set value and the shift lever is in a position corresponding to reverse or when the slope signal is less than or equal to the second set value and the shift lever is in a position corresponding to forward, the road surface is inclined downward in the forward direction of the vehicle at a set value or greater. This state, according to the present embodiment, is determined as "YES," meaning that switching control is required to reduce the rate of thrust reduction. The first and second set values of slope signals are determined in advance by prior experimentation, simulation, computation, or the like to carry out switching control when the need for reducing the rate of thrust reduction (the need for reducing a jerk felt in the vehicle) arises.

If S4 gives a determination of "NO," for example, when the slope signal is not greater than or equal to the first set value and the shift lever is in reverse (R), when the slope signal is not less than or equal to the second set value and the shift lever is in forward (D, L, S, or other shift lever positions), and the like, switching control is not necessary. Then the current maintenance control continues, that is, the process goes to S5 to continue the operation of the motors 43B for release, keeping the H bridge circuit 27A on for release (Tr1: OFF, Tr2: ON, Tr3: ON, Tr4: OFF) (continuing release ON)

Subsequent S6 determines whether the thrust of piston 39 is zero (whether the brake pads 33 has begun to move away from the disc rotor 4). This determination can be made, for example, on the basis of changes in the current to the electric motors 43B (motor current) detected by the current sensor 28. For example, when the current (motor current) to the electric motors 43B) is less than or equal to a set value and a change in current with time is less than or equal to a set value, it is determined that the thrust is zero in this state.

If "NO" in S6, meaning that the thrust of piston 39 is not zero, the process goes back and repeats S6. If "YES," meaning the thrust of piston 39 is zero, the process goes to S7.

S7 determines whether the brake pads 33 and the disk rotor 4 has a predetermined clearance therebetween, or whether the clearance (X1+X2), the sum of X1 and X2 of FIG. 2, is greater than or equal to a predetermined clearance threshold value. The clearance can be determined as a displacement amount of the brake pads 33 after the thrust is determined to be zero (the brake pads 33 and the disc rotor 4 began to move away from each other), or after it is determined in S6 to be "YES," on the basis of the relationship among a current value, a voltage value, and an amount of rotation of the electric motors 43B and the relationship between the amount of rotation and a displacement amount (amount of retreat) of the brake pads 33 (pistons 39, linear-movement members 42). The clearance threshold is determined in advance by prior experimentation, simulation, computation, or the like to complete the release operation with a proper clearance.

If "NO" in S7, meaning that the clearance has not reached a set value (clearance threshold value), the process goes back and repeats S7. If "YES," meaning that the clearance is greater than or equal to the clearance threshold value, the process goes to S8 to stop the operation of the electric motors 43B for release, turning the H bridge circuit 27A off (Tr1: OFF, Tr2: OFF, Tr3: OFF, Tr4: OFF). The process then goes through the return back to the start to repeat the process from S1.

If "YES" in S4, meaning that the slope signal is greater than or equal to the first set value and the shift lever in reverse (R) or that the slope signal is less than or equal to the second set value and the shift lever is in forward (D, L, S, or other shift lever positions), switching control is required. Then the process goes to S9 to perform switching operation, in which the H bridge circuit 27A is switched "from downstream OFF to brake to OFF to release ON." One cycle (cycle time), defined as the entire duration of downward OFF, brake, OFF, and release ON, is set to a desired rate of reduction in the thrust of piston 39. Each of the durations of downstream OFF, brake, OFF, and release ON may be the same as or different from one another. The H bridge circuit 27A may be switched "from downstream OFF to OFF to release ON" (omitting "brake" state).

After one cycle of switching control in S9, the process goes to S10 to determine whether a condition for terminating the switching control is satisfied, that is, whether to continue the switching control to reduce a jerk felt in the vehicle or terminate the switching control and move onto current maintenance control to reduce resistance to or a hitch in a vehicle movement.

More specifically, S10 detects a start of the vehicle on the basis of the acceleration of the vehicle indicated by an acceleration signal (G sensor value) obtained by the acceleration sensor 20. Upon detection of a vehicle start, which is determined to be satisfaction of the condition for terminating the switching control, the switching control ends. In this way, the rate of reduction in the thrust of piston 39 (rate of reduction in braking force of piston 39) is made different before and after the detected vehicle start. In other words, the detection of the vehicle start leads to termination of the switching control, which in turn leads to a start of current maintenance control to make the rate of thrust reduction (the rotational speed of the electric motors 43B) higher than that before the vehicle start.

For this purpose, if switching control is started in response to a determination of "YES" in S4 based on the fact that the slope signal is greater than or equal to the first set value and the shift lever is in reverse, S10 determines whether the acceleration is lower than or equal to a third set value. If, on the other hand, switching control is started in response to a determination of "YES" in S4 based on the fact that the slope signal is less than or equal to the second set value and the shift lever is in forward, S10 determines whether the acceleration is greater than or equal to a four set value (a threshold value g4 for terminating switching control in FIG. 5).

The acceleration is defined, for example, as positive (plus) for the forward direction of the vehicle and negative (minus) for the rearward direction of the vehicle. The third set value and fourth set value are determined in advance by prior experimentation, simulation, computation, or the like to properly detect a start of the vehicle, that is, to reduce resistance to or a hitch in movement of the vehicle that may be felt. Such detection of a vehicle start may be based, for example, on whether a change in acceleration at present (in S10) has exceeded a predetermined level from a value averaged over a period starting from the receipt of a release command (at the time of determination of "YES" in S1) until the end of mask time. In this case, S2 and S3 are interposed by a process of S21 for averaging the acceleration detected by the acceleration sensor 20. This enables detection of a vehicle start in S10 (that satisfies the condition for terminating the switching control) when the difference between the present acceleration detected by the acceleration sensor 20 and the average acceleration during the mask time calculated in S21 has exceeded a predetermined value or when the difference between the present value and the average value has continued to be (greater than or equal to) a set value for longer than a predetermined length of time.

If "YES" in S10, indicating that the acceleration is lower than or equal to the third set value, it is determined that the vehicle has started to move back. If "YES" in S10, indicating the acceleration is greater than or equal to the fourth set value, it is determined that the vehicle has started to move ahead. Either case requires terminating the switching control and starting current maintenance control to increase the rate of reduction in the thrust of piston 39. For this reason, if "YES" in S10, the process goes to S5 onward to perform current maintenance control.

If "NO" in S10, it is determined that the vehicle is at rest. Then the process goes to S11 to determine whether the thrust of piston 39 has reached zero (whether the brake pads 33 has begun to move away from the disk rotor 4). This determination can be made, for example, on the basis of whether a predetermined amount of time for the thrust to be estimated to drop to zero has elapsed from the start of release (for example, upon the determination of "YES" in S1) or whether alternations between ON and OFF of the switching control have reached a predetermined number required to reduce the thrust to zero. Such a predetermined amount of time or predetermined number of alternations is determined in advance by prior experimentation, simulation, computation, or the like.

If the determination "NO" in S11, indicating that the thrust of pistons 39 has not reached zero (a predetermined amount of time has not elapsed), the process goes back and repeats S9 onward to continue the switching operation. If, on the other hand, the determination is "YES" in S11, indicating that the thrust of pistons 39 is zero, the process moves on to S12 to terminate the switching control and start current maintenance control, and to continue the release operation of the motors 43B, that is, while the H bridge circuit 27A is kept in "release ON" state, the process goes to S7 and onward.

Next, a time chart for the process of FIG. 6 by the parking-brake controller 23 is described with reference to FIG. 5. In this figure, switching control is indicated by Sw, current maintenance control by I.

Upon receipt, at time (a) on the time axis of FIG. 5, of an automatic release command from the release determination logic in the parking-brake controller 23, S1 of FIG. 6 makes a determination of "YES," starting a release operation of the electric motors 43B (turning the H bridge circuit 27A on for release (release ON)). At time (b) on the time axis of FIG. 5, the end of mask period (first set time ti), the process goes to S4 of FIG. 6 to determine whether Sw is required. If a need for Sw is detected in S4, which means that the vehicle is inclined downward to a predetermined degree or greater in the movement direction of the vehicle and there is a need for reducing the rate of reduction of the piston 39 to reduce a jerk that may be felt in the vehicle, the process goes to S9 to start Sw. The Sw, from (b) to (c) on the time axis, reduces the rate of reduction in the thrust of pistons 39, as indicated by the solid line for characteristic 29C in FIG. 5, or, in other words, reduces the rate of reduction in the thrust of pistons 39 to a level lower than that indicated by the bold dashed line for characteristic 29C' in the case of continuation of I. This reduces a jerk that may be felt.

Upon detection of a vehicle start at (c) on the time axis of FIG. 5, indicating that the acceleration (G sensor value) is greater than or equal to a threshold for termination of Sw (fourth set value g4), S10 of FIG. 6 makes a determination of "YES," moving on to S5. This terminates Sw and starts I to increase the rate of reduction in piston thrust and thus a resistance to or a hitch in movement of the vehicle that may be felt by the driver and any other occupants. The process then goes to S6 to determine whether the thrust has reached zero. If yes, the process goes to S7 to start a determination as to clearance. At (d) on the time axis of FIG. 5, S7 determines that the brake pads 33 and the disc rotor 4 has secured a clearance therebetween, terminating the release operation of the electric motors 43B (terminating the release).

As described above, the parking-brake controller 23, at least, performs both the current maintenance control and the switching control during the period starting from the reception of a release command for a start of release operation until the end of the release operation. The switching operation (gradually) decreases the rate of reduction in the thrust of piston 39 (rate of reduction in braking force of piston 39), reducing discomfort felt by the driver and any other occupants, e.g., a perceptible jerk of the vehicle due to a high rate of thrust reduction at the start of the vehicle. The current maintenance control, while being performed, increases the driving speed (rotational speed) of the electric motors 43, thereby, after the reception of a release command (before the start of switching control), shortening the time it takes to start reducing the thrust of piston 39. Current maintenance control following the end of switching control reduces a resistance or a hitch in movement of the vehicle that may be felt by the driver and any other occupants, reducing discomfort felt at the time of release and achieving a smooth release operation.

The current maintenance control and the switching controls can be performed with the aid of software (release operation program) stored in the parking-brake controller 23. Such software renders it possible to vary clamping force (thrust), which would otherwise be released at a fixed rate at the time of release. Therefore, reduction of discomfort felt at the time of release and smooth release operation can be achieved without adding hardware specially designed to vary clamping force (or change the speed of the electric motors 43B).

In one embodiment, the parking-brake controller 23 varies the rate of reduction in the thrust of piston 39 (rate of reduction in braking force of piston 39) on the basis of a slope signal (indicating the angle of inclination of the vehicle) from the slope sensor 18 and a gear position signal (indicating the position of the shift lever) from the shift sensor 19. This permits a determination, on the basis of the vehicle inclination and the position of the shift lever, as to whether the road is inclined downward to a large degree in the movement direction of the vehicle. If reduction of a perceptible jerk is required, that is, if the road is inclined steeply downward in the direction of vehicle movement, the thrust of the pistons 39 can be reduced at a lower rate. Otherwise, that is, if the road is level (horizontal), the rate of reduction in the thrust of piston 39 can be higher.

In another embodiment, the parking-brake controller 23 sets the rate of thrust reduction when a slope signal indicates greater than or equal to a predetermined angle and the direction of movement of the vehicle is downward, to a lower value than that when the absolute value of a slope signal is less than the predetermined angle. This makes it possible to lower the rate of reduction in the thrust of piston 39 when the vehicle is on a steep slope (whose absolute value is greater than or equal to a predetermined value), where the vehicle tends to readily accelerate in its moving direction, so as to reduce a jerk that may be felt. If, on the other hand, the vehicle is on an a gradual slope, where the vehicle has little tendency for acceleration in the direction of its movement, or a level surface (whose absolute value of slope is lower than the predetermined value), it is possible to increase the rate of reduction in the thrust of piston 39 for a prompt release (for a shorter time from the start to the end of the release).

In still another embodiment, the parking-brake controller 23 allows the rate of reduction in the thrust of piston 39 to vary upon detecting a movement of the vehicle; that is, the parking-brake controller 23 increases the rate of thrust reduction upon detecting a movement of the vehicle, thereby reducing a resistance or hitch in movement of the vehicle felt by the driver and any other occupants.

In still another embodiment, the parking-brake controller 23 performs current maintenance control and switching control only at the start of the vehicle. This can reduce discomfort (jerk) felt by the driver and other occupants and to achieve a smoother release operation (reducing the time it takes before piston thrust begins to drop or reducing a resistance or a hitch felt at the start of the vehicle).

In still another embodiment, the parking-brake controller 23 performs current maintenance control and switching control for an AT vehicle only. This can reduce discomfort at the time of brake release and achieve smooth release operation.

In still another embodiment, switching operation is a fixed pulse width switching control with a duty ratio between current application to the electric motors 43B and interruption, namely, a duty ratio between connection (release ON) of the H bridge circuit 27A for applying current to the electric motors 43B and discontinuation (OFF, downstream OFF, and brake) fixed to a predetermined value (a fixed value greater than 0% and lower than 100%). In this case, the rate of reduction in the thrust of piston 39 during switching operation is set to a fixed value corresponding to a predetermined duty ratio (constant value). In other words, switching between switching control and current maintenance control permits a change in the rate of reduction in the thrust of piston 39 (between a rate for the switching control and a rate for the current maintenance control).

The switching control may be a pulse-width modulation switching control that varies in duty ratio within a range greater than 0% and lower than 100%. This permits changes in the rate of reduction in the thrust of piston 39 during switching control, according to vehicle conditions, etc.; that is, during the switching control, changes in the duty ratio according to changes in vehicle conditions permit changes in the rate of reduction in the thrust of piston 39.

In still another embodiment, the parking-brake controller 23 performs current maintenance control and switching control when the slope is greater than or equal to the first set value and the shift lever is in reverse or when the slope is lower than or equal to the second set value and the shift lever is in forward. Proper adjustment of the first and second set values reduces discomfort (jerk) felt by the driver and any other vehicle occupants in a vehicle forward or backward movement.

In still another embodiment, the parking-brake controller 23 starts switching control when the slope is greater than or equal to the first set value and the shift lever is in a position corresponding to reverse, and subsequently ends the switching control. Subsequently when the acceleration detected by the acceleration sensor 20 goes down below the third set value, the switching control is succeeded by current maintenance control. Thus proper adjustment of the third set value reduces resistance or a hitch in the start of the vehicle's rearward movement that may be felt by the driver and any other occupants.

In still another embodiment, after starting switching control when the slope is lower than or equal to the second set value and the shift lever is in forward, the parking-brake controller 23 ends the switching control and begins current maintenance control when the acceleration has reached the fourth set value or greater. Proper adjustment of the fourth set value thus reduces resistance or hitch in the start of vehicle forward movement that may be felt by the driver and any other occupants.

In still another embodiment, the H bridge circuit 27A is used in the current maintenance control and switching control. The current maintenance control is performed by keeping the switches 27A1 to 27A4 of the H bridge circuit 27A in the state of release ON for over a predetermined amount of time. The switching control is performed by repeatedly switching the switches 27A1 to 27A4 of the H bridge circuit 27A between the states of release ON, OFF, and downstream OFF, and brake periodically. The predetermined amount of time (the duration of release ON) in the current maintenance control is set longer or equal to one cycle of switching control (predetermined amount of time≥one cycle).

The above embodiments are described in terms of an example of detecting a vehicle start with the acceleration sensor 20. Such detection, however, may be performed, instead, by the wheel speed sensor 21, a wheel speed detector.

The above embodiments are described in terms of an example using the slope sensor 18 and the acceleration sensor 20. Instead, an acceleration sensor 20 for detecting forward/rearward acceleration that also detects slope may be used to serve as a slope sensor (slope detector) and an acceleration sensor (acceleration detector). This reduces the number of parts (dispensing with a sensor).

The above embodiments are described in terms of an example of detecting forward/rearward acceleration with the acceleration sensor 20. The acceleration sensor 20, however, may be substituted, for example, by an acceleration sensor (acceleration detector) that detects upward/downward, right/left, pitch acceleration or the like.

The above embodiments are described in terms of an example of switching control with the H bridge circuit 27A that follows the sequence: "release ON, downstream. OFF, brake, and OFF" states repeatedly and periodically. However, the sequence, however, may be "downstream OFF, OFF, and release ON" performed periodically and repeatedly, omitting "brake" states.

The above embodiments are described in terms of an example of the parking brake controller 23 that, (immediately) upon receiving a release command, performs current maintenance control, switching control, current maintenance control in this order. The controller may be modified so that (immediately) upon receiving a release command, it performs switching control and thereafter performs current maintenance control. This permits a gradual reduction in piston thrust in switching control, reducing a jerk felt by the driver and other occupants, and current maintenance control following the switching control, which reduces resistance or a hitch in a vehicle start that may be felt by the driver and other occupants.

The above embodiments are described in terms of an example using the disc brakes 31 for right and left rear wheels, the disc brakes 31 having an electric parking brake function. Instead, such disc brakes may be used for right and left front wheels instead of rear wheels, or for all (four) wheels.

The above embodiments are described in terms of an example of hydraulic disc brakes 31 having an electric parking brake function. Such disc brakes may be replaced with electric disc brakes that do not require hydraulic pressure. The present invention is not limited to a disc-brake type brake apparatus and can be a drum-brake type brake apparatus. The present invention is applicable to a variety of brake mechanisms, for example, drum-in-disc brakes combining disc brakes and drum-type electric parking brakes, and brake apparatuses that keep parking brakes on by pulling cables with the aid of electric motors.

The above embodiments achieve both reduction of discomfort felt at the time of release and smooth release operation.

More specifically, the above embodiments use a controller that perform at least current maintenance control (continuously applying current to electric motors) and switching control (periodically applying current to the electric motors) during a period from the start of release operation upon reception of a release command until the end of the release operation. The switching control (0%<duty ratio<100%), while being performed, gradually decreases the rate of reduction in piston thrust (force reduction rate), reducing discomfort felt by the driver and other occupants, for example, a jerk due to a fast reduction of thrust at the start of a vehicle movement. The current maintenance control (100% duty ratio) increases the (rotational) speed of the motors. By performing current maintenance control, for example, at the beginning of release, the time it takes for piston thrust to begin dropping can be reduced. The current continuation control at the end of release, on the other hand, reduces resistance and a hitch felt by the driver and other occupants at the start of vehicle movement, reducing discomfort felt at the time of release and achieving smooth release operation.

The current maintenance control and switching control can be performed with software in the controller. Such software can change or vary clamping force (thrust) that would otherwise be reduced at a constant rate at the time of release. Such software can reduce discomfort felt at the time of release and achieve smooth vehicle operation, without the need for adding another hardware specially designed to change clamping force (or the speed of the electric motors).

According to one embodiment, the controller, upon receiving a release command, performs current maintenance control, thereafter switching control, and thereafter again current maintenance control. The current maintenance control upon receiving a release command reduces the time it takes for piston thrust to begin dropping. The switching control after the current maintenance control gradually reduces the piston thrust and a jerk felt by the driver and other occupants. The current maintenance control after the switching control reduces resistance or a hitch felt by the driver and other occupants at the start of vehicle movement.

According to another embodiment, the controller, upon receiving a release command, performs current maintenance control until the end of the first set time, then switching control until the end of the second set time, and then current maintenance control. The current maintenance control from the reception of a release command to the end of the first set time reduces the time it takes for piston thrust to begin falling. The switching control from the end of the first set time to the end of the second set time gradually reduces the piston thrust and thus reduces a jerk felt by the driver and other occupants. The current maintenance control after the end of the second set time reduces resistance or a hitch felt by the driver and other occupants at the start of vehicle movement.

According to still another embodiment, the controller, upon receiving a release command, performs switching control and thereafter current maintenance control. The switching control after receiving a release command gradually reduces piston thrust and thus reduces a jerk felt by the driver and other occupants, while the current maintenance control after the end of the switching control reduces resistance and a hitch felt by the driver and occupants at the start of vehicle movement.

Still another embodiment uses a slope detector for detecting the scope on which the vehicle is located and a gear position detector for detecting the vehicle gear position. The controller varies the rate of reduction in piston thrust on the basis of the slope detected by the slope detector and the gear position detected by the gear position detector. The slope and the gear position are used to determine whether the road is inclined steeply downward (e.g., to a predetermined degree or greater) in the moving direction of the vehicle. To reduce a perceptible jerk, if necessary (for example, when the vehicle is located on a road steeply inclined downward in the moving direction of the vehicle), piston thrust can be reduced at a lower rate. Otherwise (e.g., for a level road), the piston thrust can be reduced at a high rate.

According to still another embodiment, the controller makes lower the rate of thrust reduction when the slope is greater than or equal to a predetermined degree and is inclined downward in the direction of vehicle start than that when the absolute value of the slope is less than the predetermined angle. This permits a lower rate of reduction in piston thrust when the vehicle is on a steep slope (whose absolute value is greater than equal to a predetermined angle), which tends to accelerate the vehicle in the direction of vehicle movement, and thus reduces a jerk that may be felt. On the other hand, when the vehicle is on a gradual slope that does not tend to accelerate the vehicle in the direction of its movement or on a level surface (whose absolute value of slope is lower than a predetermined value), piston thrust can be reduced at a high rate to promptly complete release operation (reducing the time it takes from the start to the end of the release).

According to still another embodiment, the controller, upon detecting a vehicle movement, makes the rate of reduction in piston thrust variable, that is, increases the rate of thrust reduction. The rate of thrust reduction is increased, for example, by increasing the duty ratio of switching control (within a range greater than 0% and lower than 100%) or by ending the switching control and starting current maintenance control (duty ratio=100%). This reduces resistance or a hitch felt by the driver and other occupants at the start of vehicle movement.

According to still another embodiment, the controller performs current maintenance control and switching control only at the start of vehicle movement. This reduces discomfort (jerk) felt by the driver and other occupants at the start of the vehicle and achieves smooth release operation (shorter time required to reduce piston thrust, and reduction of resistance or a hitch felt at the start of the vehicle).

According to still another embodiment, the controller performs current maintenance control and switching control for an AT vehicle only. This reduces discomfort at the brake release of the AT vehicle and achieves smooth release operation.

According to still another embodiment, the switching control is pulse-width modulation control (PWM control) with a variable duty ratio of current application to motors and interruption, or a variable duty ratio of the ON state of motor current application on and the OFF state (in a range greater than 0% and lower than 100%). This makes the rate of reduction in piston thrust variable during the switching control. Such a variable duty ratio (greater than 0% and lower than 100%) during the switching control renders it possible to change the rate of reduction in piston thrust, according to the conditions, etc. under which the vehicle is being placed.

According to still another embodiment, the switching control is pulse-width modulation control (PWM control) with a duty ratio of current application to motors and interruption, or a duty ratio of the ON state of motor current application and the OFF state, fixed to a predetermined value (a fixed percentage greater than 0% and lower than 100%). This sets the rate of reduction in piston thrust constant during the switching control to a fixed value corresponding to the predetermined (fixed) duty ratio. By switching between the switching control (with a duty ratio greater than 0% and lower than 100%) and current maintenance operation (with 100% duty ratio), the rate of reduction in piston thrust can be changed, according to conditions, etc. under which the vehicle is being placed.

According to still another embodiment, the controller performs current maintenance control and switching control when the slope detected by the slope detector is greater than or equal to the first set value and the gear position detected by the gear position detection is in reverse or when the slope detected by the slope detector is lower than or equal to the second set value and the gear position detected by the gear position detector is in forward. Proper adjustment of the first and second set values reduces discomfort (jerk) felt by the driver and other occupants at the time of rearward and forward movement.

Still another embodiment uses an acceleration detector for detecting vehicle acceleration. The controller performs switching control when the slope detected by the slope detector is greater than or equal to the first set value and the gear position detected by the gear position detector is in reverse, and subsequently ends the switching control and starts current maintenance control when the acceleration detected by the acceleration detector becomes less than or equal to the third set value. Proper adjustment of the third set value reduces resistance or a hitch felt by the driver and other occupants at the start of rearward movement of the vehicle.

Still another embodiment uses an acceleration sensor for detecting vehicle acceleration. The controller starts switching control when the slope detected by the slope detector is lower than or equal to the second set value and the gear position detected by the gear position sensor is in a position for forward movement, and subsequently end the switching control and starts current maintenance control when the acceleration detected by the acceleration sensor becomes greater than or equal to the fourth set value. Proper adjustment of the fourth set value reduces resistance or a hitch felt by the driver and other occupants at the start of forward movement of the vehicle.

According to still another embodiment, current maintenance control and switching control are performed by an H bridge circuit. The current maintenance control is performed by operating each switch of the H bridge circuit to keep current application (ON) to electric motors for over a predetermined amount of time. The switching control is performed by turning the switches of the H bridge circuit on and off to alternate between current application to the motors (ON) and interruption (OFF, if necessary, downstream OFF, brake) periodically.

The brake apparatus according to the above embodiments reduces discomfort felt at the time of release and achieves smooth release control.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

Although the embodiments of the present invention have been described above based on some examples, the described embodiments are for the purpose of facilitating the understanding of the present invention and are not intended to limit the present invention. The present invention may be modified and improved without departing from the spirit thereof, and the invention includes equivalents thereof. In addition, the elements described in the claims and the specification can be arbitrarily combined or omitted within a range in which the above-mentioned problems are at least partially solved, or within a range in which at least a part of the advantages is achieved.

This application claims priority under the Paris Convention to Japanese Patent Application No. 2014-156969 filed on Jul. 31, 2014.

The entire disclosure of Japanese Patent Application No. 2014-156969 filed on Jul. 31, 2014 including specification, claims, drawings and summary is incorporated herein by reference in its entirety.

The entire disclosure of Japanese Patent Application Publication No. 2004-142515 including specification, claims, drawings and summary is incorporated herein by reference in its entirety.

REFERENCE NUMERALS 2. front wheel (wheel)
3. rear wheel (wheel)
4. disc rotor (rotor)
6. brake pedal
18. slope sensor (slope detector)
19. shift sensor (gear position detector)
20. acceleration sensor (acceleration detector)
21. wheel speed sensor (wheel speed detector)
22. parking brake switch (command generator)
23. parking brake controller (command generator, executor, controller)
33. brake pad (friction member)
39. piston
43B. electric motor

What is claimed is:

1. A brake apparatus comprising:
a piston configured to move a friction member to be pressed on a rotating member rotating with a wheel to apply braking force to a vehicle;
an electric motor configured to operate a thrust retaining mechanism to thrust the piston and maintain braking force exerted by the piston, in response to electric current applied to the electric motor;
a command generator configured to generate an application command for applying braking force to the vehicle and a release command for releasing braking force from the vehicle; and
a controller configured to operate the electric motor by performing current maintenance control, which continuously applies current to the electric motor, upon receiving the release command generated by the command generator, performing switching control, which successively switches between a larger and a smaller amount of electric current applied to the electric motor, after the end of the current maintenance control, and performing the current maintenance control after the end of the switching control, so as to reduce braking force exerted by the piston.

2. A brake apparatus according to claim 1, wherein the controller is configured to perform:
the current maintenance control upon receiving the release command until the end of a first set time;
the switching control after the end of the first set time until the end of a second set time; and
the current maintenance control after the end of the second set time.

3. A brake apparatus according to claim 1, wherein the controller is configured to receive:
a slope signal from a slope detector configured to detect a slope of a road surface on which the vehicle is stopped; and
a gear position signal from a gear position detector configured to detect a gear position of the vehicle, and wherein
a speed of reduction in braking force exerted by the piston is changed on the basis of the slope signal detected by the slope detector and the gear position signal detected by the gear position detector.

4. A brake apparatus according to claim 3, wherein the controller is configured to make lower the speed of reduction in braking force when the absolute value of an angle of inclination based on the slope signal is greater than or equal to a set angle and a direction of movement of the vehicle is downward than that when the absolute value of the angle of inclination based on the slope signal is less than the set angle.

5. A brake apparatus according to claim 3, wherein the controller is configured to perform the current maintenance control and the switching control under the following condition:
the slope signal output from the slope detector is greater than or equal to a first set value, and the gear position signal output from the gear position detector indicates a gear position corresponding to a rearward movement of the vehicle; or
the slope signal output from the slope detector is lower than or equal to a second set value, and the gear position signal output from the gear position detector indicates a gear position corresponding to a forward movement of the vehicle.

6. A brake apparatus according to claim 5, wherein
the controller is configured to receive an acceleration signal from an acceleration detector configured to detect an acceleration of the vehicle, and wherein
the controller is configured to perform the switching control when the slope signal output from the slope detector is greater than or equal to the first set value and the gear position signal output from the gear position detector indicates a gear position corresponding to a rearward movement, and subsequently ends the switching control and starts the current maintenance control when the acceleration signal output from the acceleration detector is lower than or equal to a third set value.

7. A brake apparatus according to claim 5, wherein the controller is configured to receive an acceleration signal from an acceleration detector configured to detect acceleration of the vehicle, and wherein
the controller is configured to perform the switching operation when the slope signal output from the slope detector is lower than or equal to a second set value and the gear position signal detected by the gear position detector indicates a gear position corresponding to a forward movement of the vehicle, and subsequently ends the switching control and starts the current maintenance control when the acceleration signal output from the acceleration detector is greater than or equal to a fourth set value.

8. A brake apparatus according to claim 1, further comprising a sensor for detecting a start of movement of the vehicle, wherein the controller, upon detecting the start of movement of the vehicle, is configured to change a speed of reduction in braking force exerted by the piston.

9. A brake apparatus according to claim 1, further comprising a sensor for detecting a start of movement of the vehicle, wherein the controller, upon detecting the start of movement of the vehicle, is configured to increase the rate of reduction in braking force to a higher level than that before detecting the movement of the vehicle.

10. A brake apparatus according to claim 1, wherein the controller is configured to perform the current maintenance control and the switching control at a start of the vehicle.

11. A brake apparatus according to claim 10, wherein the controller is configured to perform the current maintenance control and the switching control in a vehicle having an automatic transmission.

12. A brake apparatus according to claim 1, wherein the switching control is a pulse-width modulation switching control with a variable duty ratio between an ON state and an OFF state of a switch which applies electric current to the electric motor.

13. A brake apparatus according to claim 1, wherein the switching control is a fixed pulse-width switching control with a predetermined fixed duty ratio between an ON state and an OFF state of a switch which applies electric current to the electric motor.

14. A brake apparatus according to claim 1, wherein the controller has an H bridge circuit that performs the current maintenance control and the switching control.

* * * * *